Patented June 2, 1936

2,042,712

UNITED STATES PATENT OFFICE 2,042,712

INSECTICIDE

Charles B. Gnadinger, Minneapolis, Minn.

No Drawing. Application March 26, 1934,
Serial No. 717,430

11 Claims. (Cl. 167—24)

This invention relates to insecticides and to the method of producing the same.

The invention is based on the discovery of hitherto unknown properties of decalin in relation to insecticides prepared from pyrethrum flowers. Broadly, the use of decalin enables one to obtain a far greater concentration of the active principles of pyrethrum flowers than by the use of any substance known to me. Moreover, as a result of my discovery one is able to make a solution of pyrethrum flowers which can be analyzed to accurately determine the pyrethrin or active principle content, without decomposition of that active principle.

For example, the pyrethrin content of a decalin solution of the pyrethrum flowers can be determined accurately by methods now used for assaying pyrethrum flowers, without decomposition of the active principles of the flowers, the decalin remaining in solution throughout the method, and having no action on the reagents employed.

The substance decalin or decahydronaphthalene, $C_{10}H_{18}$, is considered to be a completely hydrogenated member of the naphthalene series, and I therefore broadly claim the new use of such a completely hydrogenated member of this series, for the purposes herein. The trans- or cis-form of decalin can be used, as well as the commercial form which is a mixture of the two.

In my United States Patent No. 1,915,662, there is disclosed and claimed a process for extracting pyrethrum flowers with ethylene dichloride to produce an oleo resin of pyrethrum. In that patent, there is a discussion of some of the problems relating to the subject. It is to be noted that the resulting oleo resin has heretofore been treated with solvents such as petroleum oil, acetone or alcohol to produce a concentrated commercial insecticide. For household insecticides only petroleum oil can be employed, acetone alcohol being used exclusively for horticultural insecticides.

Most of the oil extract of pyrethrum heretofore made, has contained the active principle from twenty pounds of pyrethrum flowers in one gallon of extract. A small proportion has contained the active principle from forty pounds of flowers in one gallon of extract. It has not been possible to obtain by my earlier process a greater concentration than eighty pounds of flowers per gallon, and difficulties in manufacturing processes have made it impracticable to produce commercially that degree of concentration. By the use of decalin or by the use of a mixture of decalin and naphtha, I can produce a product containing the active principles from as high as one hundred eighty to two hundred pounds of flowers per gallon.

For some time the desirability of having a highly concentrated extract of pyrethrum, which the purchaser could analyze has been apparent. A feature of this invention, (in addition to the ability to obtain a product containing a very large amount of the active principle of the flowers) is the discovery that it is possible to accurately assay the final concentrated product by assay methods now in use for analyzing pyrethrum flowers, without decomposing the active insecticidal principle.

In making my product I may start with any suitable oleo resin of pyrethrum. However, I usually prepare the oleo resin with ethylene dichloride. Any other solvents ordinarily employed for this purpose can be used. The resultant oleo resin is then extracted by warming and mixing in a suitable mixer with decalin, usually with successive portions of decalin. The larger (resinous) part of the oleo resin remains undissolved, but the pyrethrins and some of the oils in the oleo resin are dissolved. The combined decalin solutions are then diluted with naphtha whereby small amounts of resins are precipitated. The decalin naphtha solution is then cooled and filtered, and the naphtha is removed by distilling in vacuum. The remaining concentrated solution of pyrethrins in decalin, can then be diluted with petroleum oil for use as an insecticide.

The pyrethrin content of this concentrated solution of pyrethrins and decalin can be determined by the copper reduction method of Gnadinger and Corl, as in the following example: For a concentrate containing the active principles from one hundred twenty-five pounds of high test flowers per gallon, about one gram of the concentrate is accurately weighed on an analytical balance and transferred to a flask with one hundred cc. of petroleum ether (boiling below 40° C.). The solution is allowed to stand over night at about 20° C. and is then filtered into a four hundred cc. beaker, carefully washing the glass and filter with petroleum ether. A few grains of ignited sand are added and the petroleum ether is evaporated at a temperature not exceeding 75° C. After this, the procedure is exactly the same as described in Gnadinger, "Pyrethrum Flowers", published by McLaughlin Gormley King Company, Minneapolis, Minnesota, page 52, lines 27 and post, beginning: "As soon as the last traces of petroleum ether, etc."

It is to be noted that petroleum oil interferes with the determination of pyrethrins by the copper reduction method because it is insoluble in the dilute alcohol employed as solvent and separates from the solution removing some of the pyrethrins. If petroleum oil is evaporated before applying the method, part of the pyrethrin is either volatilized by the prolonged heating, or is decomposed yielding low results. There are other sources of error when petroleum oil is used. Decalin on the other hand remains in solution throughout the method, and has no action on the alkaline copper solution or other reagents employed.

Insofar as I am aware, I am the first to provide a commercial concentrated pyrethrum extract in which the pyrethrin content can be accurately determined without decomposition or volatilization of part of the pyrethrins, and I therefore broadly claim any solution which permits of such analysis.

Instead of using decalin alone, a mixture of decalin and naphtha can be used. The following is an example: Eight hundred grams of ground pyrethrum flowers are extracted with ethylene dichloride yielding fifty grams of oleo resin of pyrethrum. The fifty grams of oleo resin are washed successively with three twenty-five cc. portions of the warmed mixture of one part of decalin and one part of naphtha yielding eighty-six cc. of solution, including eleven cc. of the soluble pyrethrum extractive. The undissolved portion of the oleo resin is a solid resinous mass, inert to insects and is discarded. The eighty-six cc. of decalin naphtha solution are diluted with four hundred fifty cc. of naphtha cooled and filtered. The filtered solution is then distilled, preferably in vacuum, to remove the naphtha, yielding 48.5 cc. of decalin extract of pyrethrum.

Thus, I obtain in 48.5 cc. of decalin extract, the active principle of eight hundred grams of flowers or a concentration of about one hundred thirty-eight pounds of flowers per gallon. The decalin solution contains substantially all the pyrethrins from eight hundred grams of flowers and is highly toxic to insects, e. g. flies, when one part is diluted with one hundred thirty-seven parts of kerosene and a test is made by the Peet-Grady method, see Gnadinger "Pyrethrum Flowers", beginning page 72.

When the process is continuously employed on a number of batches, the third washing from the oleo resin is left separate from the first and second washings, and is afterwards used as the first washing for the next batch. Similarly, a fourth washing of the oleo resin can be made and this fourth solution is the second washing for the next batch. In this way, the concentration obtained can be considerably increased. For instance, in the example given above, the final volume of the decalin extract would be thirty-seven cc. instead of 48.5 cc., and the concentration would be about one hundred eighty pounds of flowers per gallon.

While the proportions of the ingredients disclosed herein are not the essence of the discovery, I have described quantitative embodiments of the process which have been found to yield excellent results, and these descriptions will suffice to disclose to those skilled in the art a practicable working basis for producing the improved product claimed herein. The quantitative disclosures are also claimed.

The finished product of my process has all of the properties of an ideal pyrethrum extract and has an unusually high concentration. It has good color and is free from resinous material which ordinarily precipitates on dilution for use and in addition, it is much less difficult to manufacture than the more highly concentrated oil extracts of pyrethrum. Moreover, the product can be chemically assayed by the purchaser using methods now in use for assaying pyrethrum flowers. Decalin is chemically stable and being completely saturated, is inert. Decalin is non-toxic to human beings.

I claim as my invention:

1. A process which consists in making a solution of an oleo resin of pyrethrum with decalin, diluting the decalin solution with naphtha to precipitate dissolved resins, cooling and filtering the decalin-naphtha solution, and removing the naphtha by distillation.

2. A process which consists in washing an oleo resin of pyrethrum with successive portions of a warmed mixture of one part decalin and one part naphtha, diluting the decalin and naphtha solution with naphtha, cooling and filtering the diluted solution, and then distilling to remove naphtha.

3. A process which consists in preparing an oleo resin of pyrethrum, extracting the oleo resin with decalin, discarding undissolved resins, diluting the decalin solution with naphtha to precipitate dissolved resins, cooling and filtering the decalin naphtha solution, and removing the naphtha by distillation.

4. A process which includes washing an oleo resin of pyrethrum with decalin, discarding undissolved portions of the oleo resin, diluting the retained solution with naphtha, filtering and then removing the naphtha.

5. A process which includes, washing an oleo resin of pyrethrum with a mixture of decalin and naphtha, diluting the decalin naphtha solution with naphtha, filtering and then removing the naphtha.

6. A process which includes, washing an oleo resin of pyrethrum with a mixture of decalin and naphtha, diluting the decalin naphtha solution with naphtha, cooling and filtering, and then distilling the filtered portion.

7. A process which includes, extracting pyrethrum flowers to obtain an oleo resin of pyrethrum, washing the oleo resin with a mixture of decalin and naphtha, diluting the decalin naphtha solution with naphtha, cooling and filtering and then distilling the filtered portion, to remove naphtha.

8. A process which includes, extracting pyrethrum flowers to obtain an oleo resin of pyrethrum, washing the oleo resin with a warm mixture of decalin and naphtha, discarding the undissolved portion of the oleo resin, diluting the decalin naphtha solution with naphtha, cooling, and filtering, and then distilling the filtered solution to remove naphtha.

9. A process which includes, extracting ground pyrethrum flowers with ethylene dichloride, washing the oleo resin successively with portions of a warmed mixture of decalin and naphtha to yield soluble pyrethrum extract, discarding the undissolved portion of the oleo resin, diluting the decalin naphtha solution with naphtha, cooling, and filtering, and then distilling the filtered solution to remove naphtha.

10. A process which includes, extracting about eight hundred grams of ground pyrethrum flowers with ethylene dichloride to yield about fifty grams of oleo resin of pyrethrum, washing the fifty grams of oleo resin successively with three twenty-five cc. portions of a warmed mixture of one part of decalin and one part of naphtha to yield eighty-six cc. of solution including about eleven cc. of soluble pyrethrum extract, diluting the eighty-six cc. of decalin naphtha solution with four hundred fifty cc. of naphtha, cooling, and filtering, and then distilling the filtered solution to remove naphtha.

11. A process which includes, extracting about eight hundred grams of ground pyrethrum flowers with ethylene dichloride to yield about fifty grams of oleo resin of pyrethrum, washing the fifty grams of oleo resin successively with three twenty-five cc. portions of a warmed mixture of one part of decalin and one part of naphtha, to yield about eighty-six cc. of solution including about eleven cc. of soluble pyrethrum extractive, discarding the undissolved portion of the oleo resin, diluting this eighty-six cc. of decalin naphtha solution with four hundred fifty cc. of naphtha, cooling and filtering, and then distilling the filtered solution in vacuum to remove naphtha and to yield about 48.5 cc. of decalin extract of pyrethrum.

CHARLES B. GNADINGER.